W. M. FULTON.
PRESSURE GAGE.
APPLICATION FILED AUG. 31, 1916.
1,344,340.
Patented June 22, 1920.
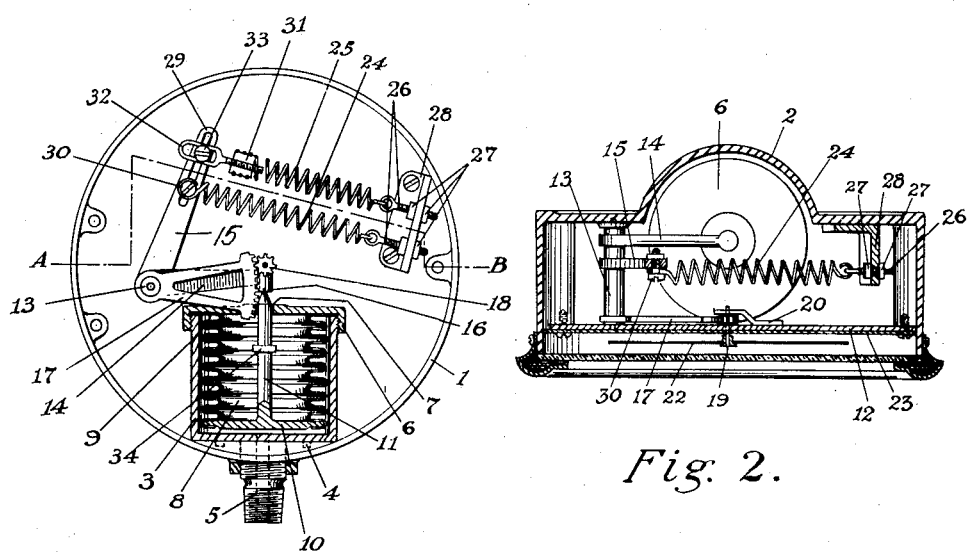
Fig. 1.
Fig. 2.
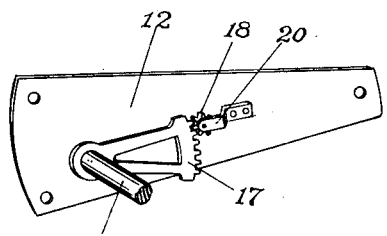
Fig. 3.
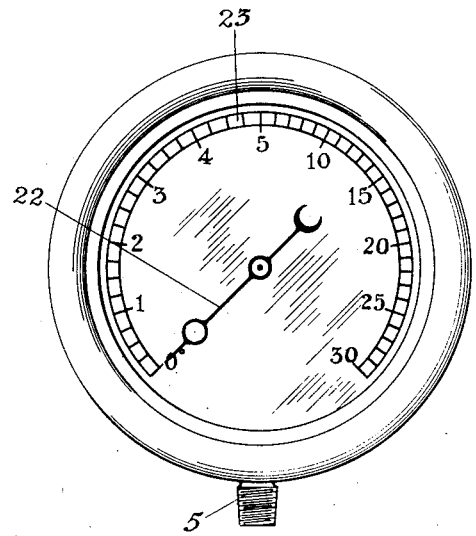
Fig. 4.
Inventor
Weston M. Fulton,
By Mauro, Cameron, Lewis & Massie
Attorneys

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

PRESSURE-GAGE.

1,344,540.　　　　Specification of Letters Patent.　　Patented June 22, 1920.

Application filed August 31, 1916. Serial No. 117,873.

*To all whom it may concern:*

Be it known that I, WESTON M. FULTON, a citizen of the United States of America, and a resident of Knoxville, Tennessee, have invented a new and useful Improvement in Pressure-Gages, which invention is fully set forth in the following specification.

This invention relates to pressure gages, and it has for an object to provide a device of this kind which is more accurate and reliable than those heretofore known to the art.

Heretofore, pressure gages commercially available have generally employed a Bourdon tube subjected interiorly to the pressure to be gaged. From the very nature of such tubes, slight variations in the resiliency of the metal, the thickness of the wall of the tube, the length of the tube, and the ratio of the major and minor axes thereof, result in variations in the action of the tubes, whereby, however great care is exercised in their manufacture, a considerable inaccuracy enters into their gaging of the pressure. It is an object of this invention to provide a gage which shall substantially obviate the above-mentioned sources of error by so increasing the area of the part subjected to the pressure to be gaged as to render substantially negligible variations that inevitably arise from the material used and the manufacturing processes employed.

A further object of this invention is to construct a pressure gage with a provision for adjustment, whereby the gage may be initially calibrated with great accuracy, and subsequently adjusted to correct any deviation from accurate indication of the pressures to which it is subjected.

Yet another object of this invention is to provide a pressure gage that will permit the reading of low pressures with great accuracy, while still providing for a large range within which pressures may be indicated thereby. Other objects relate to the provision of a pressure gage which is simple in construction, inexpensive to manufacture, and accurate and efficient in operation.

Stated briefly, the invention comprises a pressure gage having means subjected to the pressure to be gaged, preferably comprising the movable end wall of an expansible and collapsible vessel, said means being operatively related to indicating means and its movement consecutively opposed by resilient means which, in the preferred embodiment of the invention, comprises a plurality of graduated springs, said springs being shown as adjustable.

The invention is capable of receiving a variety of mechanical expressions, one of which, for purposes of illustration, has been shown on the accompanying drawing; but it is to be expressly understood that such drawing is for purposes of illustration only, and is not to be construed as a definition of the limits of the invention, reference being had to the appended claims for that purpose.

Referring to the drawing, wherein the same reference characters designate corresponding parts in the several figures, Figure 1 is an elevation, partly in section, of the interior of the casing of the gage;

Fig. 2 is a cross-section on the line A—B of Fig. 1;

Fig. 3 is a perspective view of a detail.

Fig. 4 is an elevation of the front of the casing of the gage.

Referring in detail to the drawing, 1 represents the casing or housing of the gage which may be of any preferred configuration, the embodiment illustrated being generally cylindrical and provided on its rear face with a semi-cylindrical extension 2 to inclose the expansible and collapsible vessel to be subsequently described.

Positioned within the casing 1 in the form illustrated is means constituting a chamber, the same being shown as a cylindrical vessel-like member 3, so constructed as to be fluid-tight, and rigidly mounted in position within the casing, as by screws indicated at 4. The member 3 has a nipple 5 preferably integral therewith and extending through an aperture in the wall of the casing 1 into a position to be readily connected with the source of pressure to be gaged. The means 3 is shown as closed at the top by a cover 6 which may desirably be screw-threaded thereon, said cover being provided with an axial aperture 7 for a purpose to be hereinafter described.

Mounted within the member 3 is an expansible and collapsible corrugated vessel 8, preferably constructed of a resilient metal, such as brass, the corrugations being shown as constituted by lateral walls joined at their inner and outer extremities alternately by curved walls. The upper end of this vessel is spun into a flange, as illustrated at 9, which flange is shown as rigidly clamped in position between the member 3 and its cover 6. The lower end of the vessel has brazed or otherwise fixedly secured thereto a rigid end wall 10 provided with an upwardly and axially extending stem 11, the upper end of which projects through the aperture 7.

Mounted, in the form shown, in the rear wall of the casing 1 and in a bridge-piece 12 extending transversely of the casing in the rear of the front face thereof, is a rock-shaft 13 provided with crank-arms 14 and 15 which together constitute a bell-crank lever. Arm 14 is operatively related to the stem 11 as by a pin-and-socket connection illustrated at 16. Obviously a knife-edge bearing could be employed, if preferred. Also mounted on the rock-shaft 13 is the operating element of indicating means which may be of any suitable construction and is shown as a sector 17 meshing with a pinion 18 mounted on the indicator spindle 19 which has a bearing in a bracket 20 secured to the rear face of the bridge-piece 12, and which has a further bearing in the bridge piece 12. Upon the forward end of the spindle 19 is mounted the hand or pointer 22 of the indicating means, said hand or pointer being designed to coöperate with the dial 23 to indicate the pressure to which the movable end wall 10 of the vessel 8 is subjected.

Resilient means are provided for opposing movement of the movable end wall 10, and in accordance with the preferred embodiment of this invention such means comprises a plurality of graduated springs so connected with the means subjected to the pressure as to consecutively oppose movement thereof. In the embodiment illustrated, two springs 24 and 25 are shown as connected at one end to eye-bolts 26 secured by jam-nuts 27 to an angle-piece 28, in turn fixedly secured to the rear wall of the casing. Crank-arm 15 is provided with a slot 29 extending radially of the axis of the rock-shaft 13, and spring 24 is operatively connected with a screw 30 adjustable within the slot 29, being suitably retained in adjusted position as by a clamp-nut. Spring 25 carries at its end opposite the eye-bolt 26 a block 31 into which is threaded a loop-screw 32. Within the slot provided by said loop-screw is positioned a screw 33 adjustably mounted within the aforesaid slot 29 and suitably retained in adjusted position as by a clamp-nut. Screw 33 and the slot in loop-screw 32 thereby constitute a pin-and-slot connection between the arm 15 and spring 25.

To prevent the movable end wall of the vessel 8 from moving to such position that the vessel may be injured or obtain a permanent set, the stem 11 is preferably provided with a collar 34 adapted to contact with the cover 6 and prevent movement of the movable end wall 10 beyond a predetermined limit, which limit may desirably be the limit of indications upon the dial 23. It will also be perceived that the aperture 7 in the cover 6 is made of larger diameter than the stem 11 to provide for a slight tilting of said stem in response to movements of the bell-crank lever.

The dial is divided into two sections, one for indicating lower pressures and the other for indicating higher pressures. In the embodiment illustrated, although it is to be expressly understood that the example has been selected for purposes of illustration only, the first section of the dial, which may indicate pressures up to five pounds, is provided with divisions representing ¼ pound, whereby pressures down to ⅛ pound may be accurately gaged. The remainder of the dial is divided by divisions representing one pound whereby within this range ½ pound pressures may be accurately read.

In operation, the nipple 5 is connected with the source of pressure, and the fluid under pressure enters the chamber provided by member 3, subjecting the vessel 8 exteriorly to pressure and causing end wall 10 to proportionately collapse said vessel in response to such pressure. Stem 11, moving in response to movement of the end wall 10, produces a corresponding movement of the bell-crank lever 14, 15 and of the sector 17, which, through pinion 18 and spindle 19, causes the pointer 22 to move over the face of the dial 23. During the first part of the movement of the movable end wall 10 and the connections therefrom to said pointer, movement of such wall is opposed only by the spring 24. In the embodiment illustrated such will be true of pressures up to five pounds. By the time arm 15 has moved to a position corresponding with a pressure of five pounds, screw 33 will have reached the end of the slot in the loop-screw 32, whereby further movement of the arm 15, and therefore of the movable end wall 10, is opposed by both springs 24 and 25. Thereby movement of the bell-crank lever beyond a predetermined limit is opposed by a second spring, and thereafter movement of the bell-crank lever will be less for equal changes of pressure than was obtained when only spring 24 opposed its movement.

To initially set the gage to accurately indicate the pressures being gaged, or to subsequently adjust the gage, either or both screws 30 and 33 may be loosened in slot 29 and moved toward or away from the axis of the shaft 13, decreasing or increasing their opposition to movement of the bell-crank lever. Eyebolts 26 may also be adjusted in angle piece 28 by previously loosening the jam nuts 27.

When vessel 8 is made of a resilient metal, its own inherent resiliency offers a spring-like opposition to the movement of the movable end wall 10, which must be taken into consideration in determining the tension of the springs 24 and 25, and this resiliency may be sufficient through the range of lower pressures to be gaged. Spring 25 is preferably made heavier than spring 24, though obviously it could be made of equal strength or even lighter. Therefore the term "graduated springs," as employed in the claims, is to be construed of a scope to include springs of equal or different strengths.

While the expansible and collapsible vessel has been shown as subjected exteriorly to the pressure to be gaged, it is to be understood that such is not essential. The preferred embodiment, however, comprises the construction shown upon the drawing, as the resilient action of the vessel has been found better, and the tendency to distortion has been found less, when the pressure is applied exteriorly of said vessel.

While the dial has been shown as indicating pounds of pressure, it will be obvious that any other arbitrary system of calibration may be employed, if desired.

What is claimed is:

1. A pressure gage comprising an expansible and collapsible corrugated vessel the corrugations of which are constituted by lateral walls joined at their outer and inner extremities alternately by curved walls, said vessel having a movable end wall to be subjected to the pressure to be gaged, a plurality of springs for consecutively opposing movement of said movable end wall, and indicating means operatively connected with said movable end wall.

2. A pressure gage comprising an expansible and collapsible corrugated vessel having a movable end wall to be subjected to the pressure to be gaged, resilient means coacting therewith for consecutively opposing movement of said movable end wall, and indicating means operatively connected with said movable end wall.

3. A pressure gage comprising an expansible and collapsible resilient vessel having a movable end wall to be subjected to the pressure to be gaged, adjustable resilient means opposing movement of said movable end wall and becoming operative only after said end wall has moved a predetermined distance, and indicating means operatively connected with said movable end wall.

4. A pressure gage comprising an expansible and collapsible resilient vessel having a movable end wall to be subjected to the pressure to be gaged, adjustable graduated springs to consecutively oppose movement of said movable end wall, and indicating means operatively connected with said movable end wall.

5. A pressure gage comprising an expansible and collapsible vessel having a movable end wall to be subjected to the pressure to be gaged, a lever operatively connected with said movable end wall, resilient means connected to said lever and opposing movement of said movable end wall, and indicating means operatively connected with said movable end wall.

6. A pressure gage comprising an expansible and collapsible vessel having a movable end wall to be subjected to the pressure to be gaged, a lever operatively connected with said movable end wall, graduated springs connected to said lever to consecutively oppose movement of said movable end wall, and indicating means operatively connected with said movable end wall.

7. A pressure gage comprising means constituting a chamber, an expansible and collapsible vessel in said chamber, said vessel having a movable end wall to be subjected exteriorly to the pressure to be gaged, a lever operatively connected with said movable end wall, graduated springs to consecutively oppose movement of said lever by said movable end wall, and indicating means operatively connected with said movable end wall.

8. A pressure gage comprising means to be subjected to the pressure to be gaged, a lever operatively connected to said means, indicating means operably connected with said lever, and graduated springs operatively connected with said lever to consecutively oppose movement thereof by said first-named means.

9. A pressure gage comprising means to be subjected to the pressure to be gaged, a lever operatively connected to said means, indicating means operatively connected with said lever, a spring opposing movement of said lever, and a second spring so connected with said lever as to oppose movement thereof beyond a predetermined limit.

10. A pressure gage comprising means to be subjected to the pressure to be gaged, a lever operatively connected to said means, indicating means operatively connected with said lever and comprising a sector moved by said lever and a pinion-operated pointer operated by said sector, and graduated springs operatively connected with said lever to consecutively oppose movement thereof by said first-named means.

11. A pressure gage comprising means to be subjected to the pressure to be gaged, a lever operatively connected to said means, indicating means operatively connected with said lever, a spring opposing movement of said lever, and a second spring connected to said lever by a pin-and-slot connection.

12. A pressure gage comprising means to be subjected to the pressure to be gaged, indicating means operatively connected thereto, a spring opposing movement of said pressure-operated means, and a second spring having a pin-and-slot connection with said pressure-operated means.

13. A pressure gage comprising a resilient means to be subjected to the pressure to be gaged, indicating means operatively connected thereto, and resilient means comprising a spring having a pin-and-slot connection with said pressure-operated means and adapted to oppose movement thereof beyond a predetermined limit.

14. A pressure gage comprising a resilient means to be subjected to the pressure to be gaged, a lever operatively connected to said pressure-operated means, resilient means comprising a spring so connected to said lever as to oppose movement thereof beyond a predetermined limit, and indicating means operatively connected with said pressure-operated means.

15. A pressure gage comprising an expansible and collapsible vessel having a movable end wall to be subjected to the pressure to be gaged, a lever operatively connected to said movable end wall, resilient means comprising a spring connected to said lever and adapted to oppose movement thereof beyond a predetermined limit, and indicating means operatively connected with said movable end wall.

16. A pressure gage comprising an expansible and collapsible metal vessel having a movable end wall to be subjected to the pressure to be gaged, a stem extending from said movable end wall, indicating means operable by said stem, and a stop to prevent movement of said stem beyond a predetermined limit.

17. A pressure gage comprising an expansible and collapsible vessel having a movable end wall to be subjected to the pressure to be gaged, a stem extending from said movable end wall, graduated springs to consecutively oppose movement of said stem, indicating means comprising a dial and a pointer operable by said stem, and means to prevent movement of said stem beyond the position corresponding with the maximum indication of said pointer on said dial.

18. A pressure gage comprising means constituting a chamber, an expansible and collapsible vessel in said chamber having a movable end wall to be subjected exteriorly to the pressure to be gaged, a stem extending from said movable end wall, graduated springs to consecutively oppose movement of said stem, indicating means comprising a dial and a pointer operable by said stem, and means to prevent movement of said stem beyond a predetermined limit.

19. A pressure gage comprising an expansible and collapsible vessel having a movable end wall to be subjected to the pressure to be gaged, a stem extending from said movable end wall, a lever having a pin-and-socket engagement with said stem, resilient means opposing movement of said lever, and indicating means operable by said lever.

20. A pressure gage comprising an expansible and collapsible vessel having a movable end wall to be subjected to the pressure to be gaged, a stem extending from said movable end wall, a lever having a pin-and-socket engagement with said stem, graduated springs to consecutively oppose movement of said lever, and indicating means operable by said lever.

21. A pressure gage comprising an expansible and collapsible vessel having a movable end wall to be subjected to the pressure to be gaged and having operative connections with pressure-indicating means, a lever operatively connected to said movable end wall, a spring connected to said lever and opposing movement of said movable end wall, and a second spring opposing movement of said movable end wall beyond a predetermined limit.

22. A pressure gage comprising means constituting a chamber, an expansible and collapsible vessel in said chamber having a movable end wall to be subjected exteriorly to the pressure to be gaged, said movable end wall having operative connections with pressure-indicating means, a lever operatively connected to said movable end wall, a spring opposing movement of said movable end wall, and a second spring opposing movement of said movable end wall beyond a predetermined limit.

23. A pressure gage comprising means to be subjected to the pressure to be gaged, graduated springs opposing movement of said first-named means and adjustably connected therewith, and indicating means operatively related to said first-named means.

24. A pressure gage comprising an expansible and collapsible vessel to be subjected to the pressure to be gaged, a slotted lever operatively connected thereto, a spring adjustably connected to a member movable in the slot of said lever and opposing movement of said lever by said first-named means, and indicating means operatively related to said first-named means.

25. A pressure gage comprising an expansible and collapsible vessel having a movable end wall to be subjected to the pressure to be gaged, a lever operatively connected thereto, springs adjustably connected to said lever to consecutively oppose movement of said lever by said movable end wall, and indicating means operatively related to said movable end wall.

26. A pressure gage comprising means to be subjected to the pressure to be gaged, a lever operatively connected thereto and provided with a slot at an angle to its pivot, a member adjustable in said slot, a spring connected to said member and opposing movement of said lever by said first-named means, and indicating means operatively related to said first-named means.

27. A pressure gage comprising means to be subjected to the pressure to be gaged, a lever operatively connected thereto and provided with a slot at an angle to its pivot, a plurality of members adjustable in said slot, springs connected to said members and adapted to consecutively oppose movement of said lever by said first-named means, and indicating means operatively related to said first-named means.

28. A pressure gage comprising an expansible and collapsible corrugated vessel having a movable end wall to be subjected to the pressure to be gaged, indicating means operatively connected to said movable end wall, and a plurality of springs operatively connected to said movable end wall to consecutively oppose movement thereof.

In testimony whereof I have signed this specification.

WESTON M. FULTON.